United States Patent
Johnson et al.

(10) Patent No.: US 9,264,803 B1
(45) Date of Patent: Feb. 16, 2016

(54) USING SOUNDS FOR DETERMINING A WORN STATE OF A WEARABLE COMPUTING DEVICE

(71) Applicant: Google Inc., Mountain View, CA (US)

(72) Inventors: Michael Patrick Johnson, Sunnyvale, CA (US); Carroll Philip Gossett, Mountain View, CA (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 13/910,391

(22) Filed: Jun. 5, 2013

(51) Int. Cl.
*H04R 29/00* (2006.01)
*G06F 1/16* (2006.01)
*H04R 3/00* (2006.01)
*G06T 7/40* (2006.01)

(52) U.S. Cl.
CPC *H04R 3/00* (2013.01); *G06F 1/163* (2013.01); *G06T 7/401* (2013.01)

(58) Field of Classification Search
CPC .............. H04R 1/041; H04R 2420/07; H04R 2201/107; H04R 1/10; H04R 1/20; H04R 1/22; H04R 1/222; H04R 1/24; H04R 1/245; H04R 1/26; H04R 1/265; H04R 3/04; H04R 3/007; A61B 5/01; A61B 5/681; A61B 5/0002; A61B 5/4839; A61B 5/11; A61B 5/4815; G06F 1/163; G06F 3/011; G06T 7/401; G03C 1/00; H04M 1/6066; G01S 7/539
USPC .............. 381/77, 316, 334, 58, 56, 23.1, 109, 381/379, 68, 351, 60, 71.6, 398, 312, 119, 381/330, 381, 327, 376; 455/68, 41.3, 568; 345/169, 8; 361/679.03, 679.01, 361/679.02; 348/14.08; 600/301, 300; 482/8; 700/94; 73/570; 702/141
See application file for complete search history.

(56) References Cited

U.S. PATENT DOCUMENTS

| | | | |
|---|---|---|---|
| 7,424,406 B2 * | 9/2008 | Nam | 702/190 |
| 2005/0230596 A1 * | 10/2005 | Howell et al. | 250/200 |
| 2006/0274911 A1 * | 12/2006 | Mao et al. | 381/334 |
| 2009/0085873 A1 * | 4/2009 | Betts et al. | 345/169 |
| 2010/0079356 A1 | 4/2010 | Hoellwarth | |
| 2011/0007908 A1 * | 1/2011 | Rosener et al. | 381/74 |
| 2011/0183629 A1 * | 7/2011 | Walley | 455/68 |
| 2012/0063620 A1 * | 3/2012 | Nomura et al. | 381/316 |
| 2012/0133885 A1 | 5/2012 | Howell et al. | |
| 2012/0244812 A1 | 9/2012 | Rosener | |
| 2013/0072765 A1 | 3/2013 | Kahn et al. | |
| 2013/0127980 A1 * | 5/2013 | Haddick et al. | 348/14.08 |

* cited by examiner

*Primary Examiner* — Vivian Chin
*Assistant Examiner* — Ubachukwu Odunukwe
(74) *Attorney, Agent, or Firm* — McDonnell Boehnen Hulbert & Berghoff LLP

(57) ABSTRACT

Methods, apparatus, and computer-readable media are described herein related to using self-generated sounds for determining a worn state of a wearable computing device. A wearable computing device can transmit an audio signal. One or more sensors coupled to the wearable computing device may then receive a modified version of the audio signal. A comparison may be made between the modified version of the audio signal and at least one reference signal, where the at least one reference signal is based on the audio signal that is transmitted. Based on an output of the comparison, a determination can be made of whether the wearable computing device is being worn.

19 Claims, 11 Drawing Sheets

USING SOUNDS FOR DETERMINING A WORN STATE OF A WEARABLE COMPUTING DEVICE

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" or "head-mountable devices" (HMDs). A head-mounted display places a graphic display or displays close to one or both eyes of a wearer. To generate the images on a display, a computer processing system may be used. Such displays may occupy part or all of a wearer's field of view. Further, head-mounted displays may be as small as a pair of glasses or as large as a helmet.

SUMMARY

In one aspect, the present application describes a method. The method may comprise a wearable computing device transmitting an audio signal. The method may also comprise receiving a modified version of the audio signal at one or more sensors coupled to the wearable computing device. The method may also comprise making a comparison between the modified version of the audio signal and at least one reference signal, where the at least one reference signal is based on the audio signal that is transmitted. The method may further comprise, based on an output of the comparison, making a determination of whether the wearable computing device is being worn.

In another aspect, the present application describes a non-transitory computer readable medium having stored thereon executable instructions that, upon execution by a computing device, cause the computing device to perform functions. The functions may comprise transmitting an audio signal. The functions may also comprise receiving a modified version of the audio signal at one or more sensors coupled to the computing device. The functions may also comprise making a comparison between the modified version of the audio signal and at least one reference signal, where the at least one reference signal is based on the audio signal that is transmitted. The functions may further comprise, based on an output of the comparison, making a determination of whether the computing device is being worn.

In yet another aspect, the present application describes a system. The system may comprise a head-mountable device (HMD) and at least one processor coupled to the HMD. The system may also comprise data storage comprising instructions executable by the at least one processor to cause the system to perform functions. The functions may comprise transmitting an audio signal. The functions may also comprise receiving a modified version of the audio signal at one or more sensors coupled to the HMD. The functions may also comprise making a comparison between the modified version of the audio signal and at least one reference signal, wherein the at least one reference signal is based on the audio signal that is transmitted. The functions may further comprise, based on an output of the comparison, making a determination of whether the HMD is being worn.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
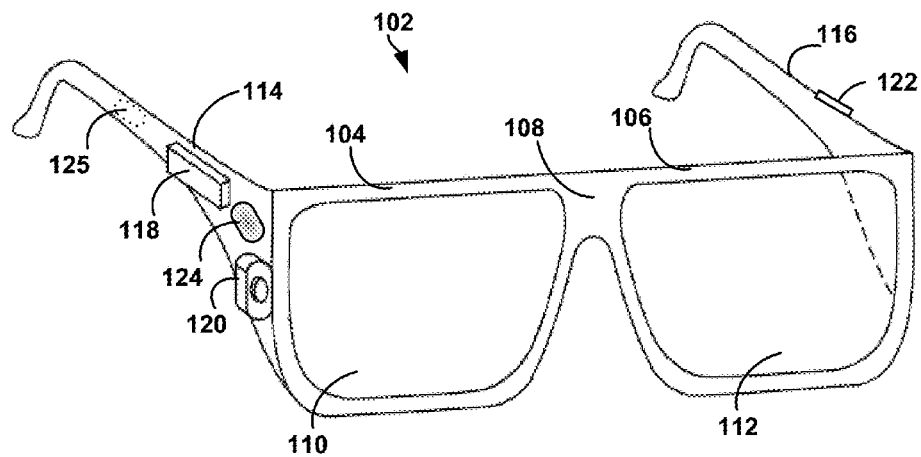
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

An example wearable computing device may be configured to determine whether it is being worn. Such an example wearable computing device may include one or more proximity sensors configured to detect a presence of a wearer of the wearable computing device. Additionally or alternatively to the use of proximity sensors, an example wearable computing device may include other sensors and methods of determining whether it is being worn, and, in some scenarios, determining whether it is being worn properly.

For example, in order for a head-mountable device (HMD) to determine whether it is being worn by a wearer, an example method may be implemented in which the HMD may first generate and transmit an audio signal and then listen for the audio signal at one or more sensors included in the HMD, similar to a "pinging" technique. However, the presence of the wearer can alter the transmitted audio signal such that audio signal received by the one or more sensors may not be the same as the originally-transmitted audio signal. For instance, the transmitted audio signal may travel through the wearer, thus changing one or more parameters of the transmitted audio signal. As such, the HMD may be configured to transmit a known audio signal (e.g., a predetermined reference signal) and then listen for that audio signal in order to see how it has been changed. The received audio signal may be a modified version of the transmitted audio signal, and may serve as an indication to the HMD of whether the HMD is being worn. When the HMD is on the wearer's head, for example, the modified audio signal received by the HMD may differ from a modified audio signal received by the HMD when the HMD is off the wearer's head.

The modified audio signal may also serve as an indication of how the HMD is being worn. For example, the transmitted audio signal may be modified differently when the HMD is being worn properly (e.g., with a display of the HMD in front of the wearer's eye) compared to when the HMD is being worn propped up on top of the wearer's head, or when the HMD is hanging on a front shirt collar of the wearer. In order for the HMD to determine how it is being worn, upon receiving/recording the modified version of the transmitted audio signal, the HMD can then compare the modified audio signal to various predetermined reference signals, each associated with a "worn state" of the HMD (e.g., worn properly, propped up on head, worn around neck, etc.).

In an example embodiment, the example method noted above may be used to verify a proximity sensor reading of the HMD, or a reading from another sensor configured to detect if the HMD is being worn, such as a capacitive sensor. For instance, a proximity sensor of the HMD may indicate to the HMD that it is being worn, and the HMD may be configured to generate an audio signal in order to verify that the proximity sensor's reading is correct. In some scenarios, the proximity sensor may indicate that the HMD is being worn, but the modified audio signal may indicate that the HMD is not being worn. In such scenarios, this may be due to an inaccurate proximity sensor reading caused by the proximity sensor detecting that the HMD is proximate to something other than the wearer's head. Other scenarios are also possible.

A determination of whether or not the HMD is being worn (or worn properly) may allow the HMD to adjust its functionality according to the worn state of the HMD. For example, when the HMD determines that it is not being worn, it may set itself to operate in a low-power mode. Further, the low-power mode may reduce the amount of power provided to various components of the HMD, or may disable such components entirely. For example, if the wearer removes the HMD from their head and puts the HMD on a table, the HMD may eventually switch off its Wi-Fi or suspend attempts to connect to wireless networks until the HMD determines that it is being worn again by the wearer. In another example, if the HMD is recording a video before the wearer removes the HMD from their head, the HMD may limit the length of the recording, stop the recording, or disable the camera being used for the recording after the HMD is removed from the wearer's head. Other examples are also possible.

It should be understood that the above examples of the method are provided for illustrative purposes, and should not be construed as limiting.

II. Example Wearable Computing Devices

Systems and devices in which example embodiments may be implemented will now be described in greater detail. In general, an example system may be implemented in or may take the form of a wearable computing device (WCD). In an example embodiment, a WCD takes the form of or includes a head-mountable device (HMD).

An example system may also be implemented in or take the form of other devices, such as a mobile phone, tablet computer, laptop computer, and computing appliance, each configured with sensors, cameras, and the like arranged to capture/scan a user's eye, face, or record other biometric data. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touchpad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touchpad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touchpad 124 is shown on the extending side-arm 114 of the HMD 102. However, the finger-operable touchpad 124 may be positioned on other parts of the HMD 102. Also, more than one finger-operable touchpad may be present on the HMD 102. The finger-operable touchpad 124 may be used by a user to input commands, and such inputs may take the form of a finger swipe along the touchpad, a finger tap on the touchpad, or the like. The finger-operable touchpad 124 may sense at least one of a pressure, position and/or a movement of one or more fingers via capacitive sensing, resistance sensing, or a surface acoustic wave process, among other possibilities. The finger-operable touchpad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touchpad surface. In some embodiments, the finger-operable touchpad 124 may be formed of one or more translucent or transparent insulating layers and one or more translucent or transparent conducting layers. Edges of the finger-operable touchpad 124 may be formed to have a raised, indented, or roughened surface, so as to provide tactile feedback to a user when the user's finger reaches the edge, or other area, of the finger-operable touchpad 124. If more than one finger-operable touchpad is present, each finger-operable touchpad may be operated independently, and may provide a different function.

In a further aspect, HMD 102 may be configured to receive user input in various ways, in addition or in the alternative to user input received via finger-operable touchpad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
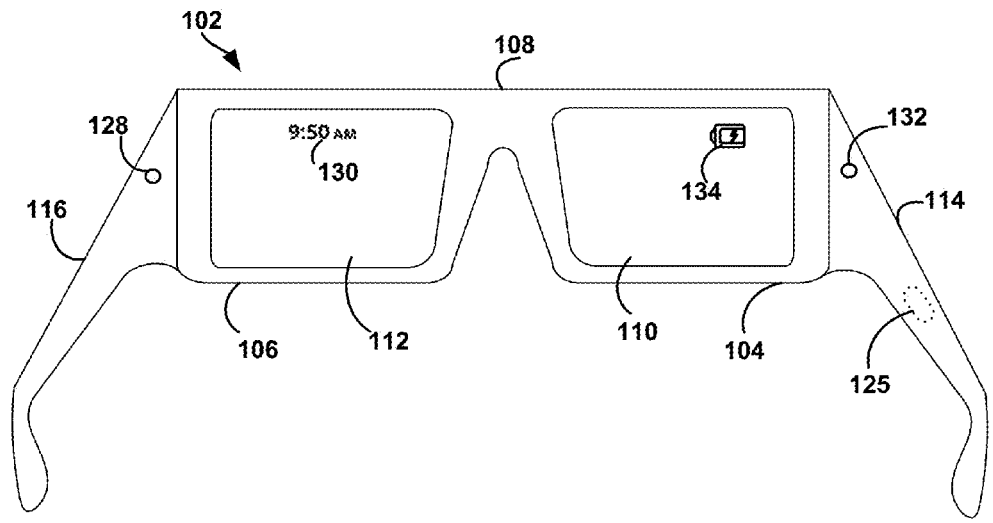
FIG. 1B illustrates an alternate view of the wearable computing system illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
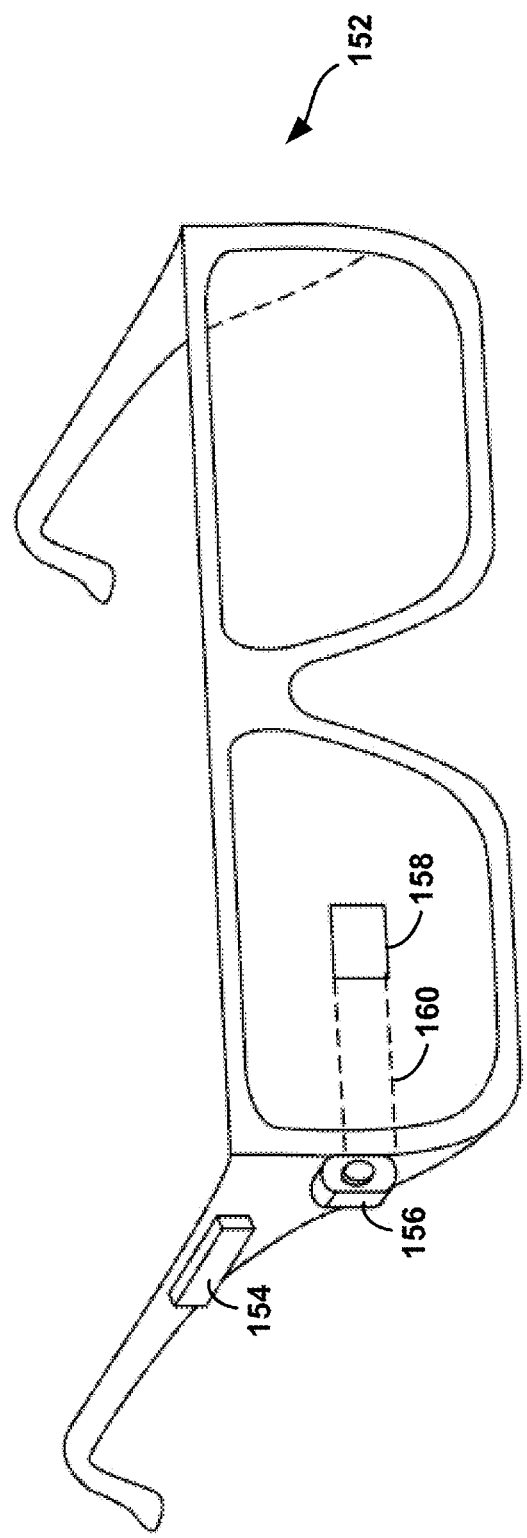
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
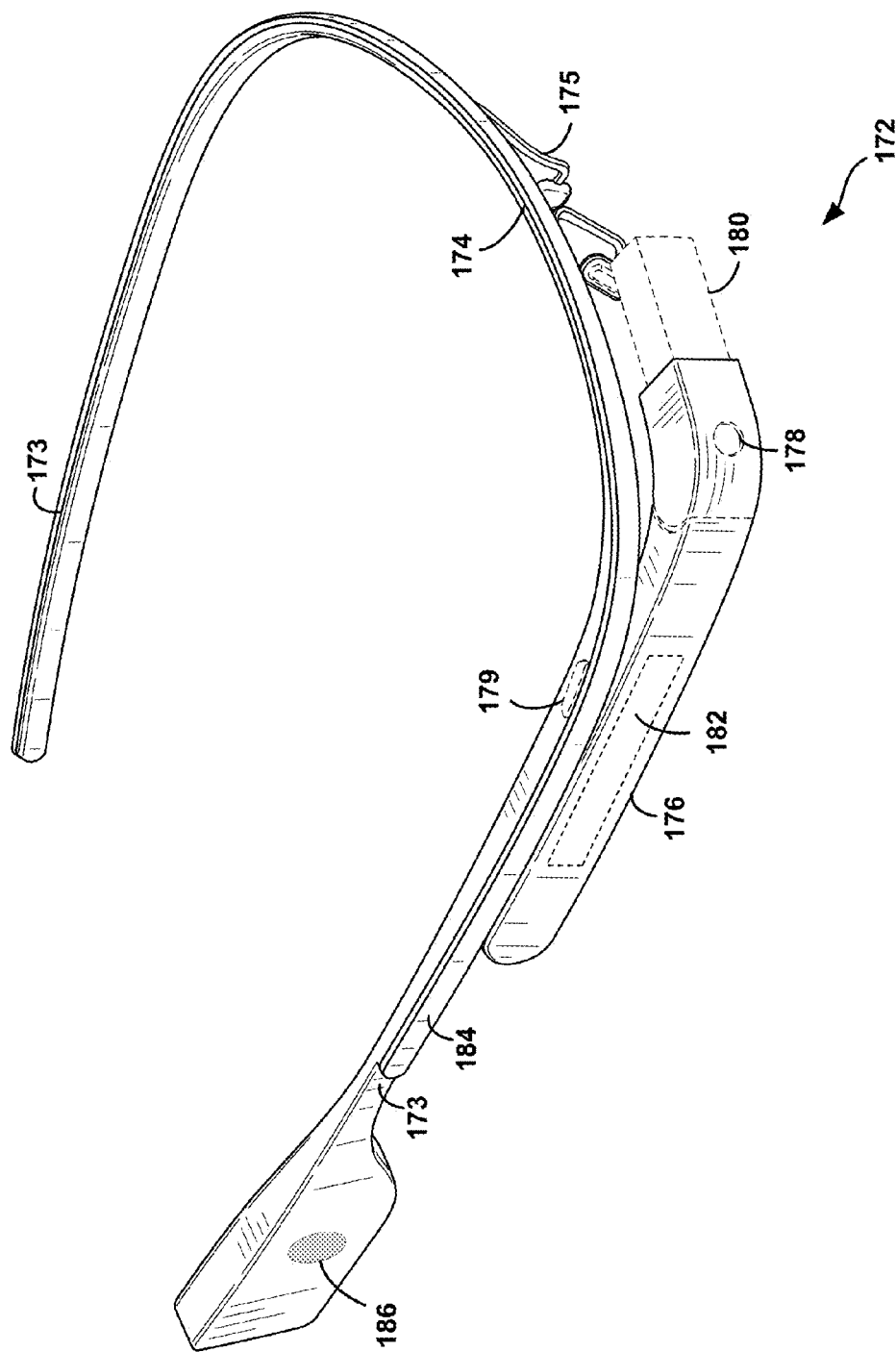
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In some embodiments, the HMD 172 may include one or more infrared proximity sensors or infrared trip sensors. Further, the one or more proximity sensors may be coupled to the HMD 172 at various locations, such as on the nosepiece 175 of the HMD 172, so as to accurately detect when the HMD 172 is being properly worn by a wearer. For instance, an infrared trip sensor (or other type of sensor) may be operated between nose pads of the HMD 172 and configured to detect disruptions in an infrared beam produced between the nose pads. Still further, the one or more proximity sensors may be coupled to the side-arms 173, center frame support 174, or other location(s) and configured to detect whether the HMD 172 is being worn properly. The one or more proximity sensors may also be configured to detect other positions that the HMD 172 is being worn in, such as resting on top of a head of a wearer or resting around the wearer's neck.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
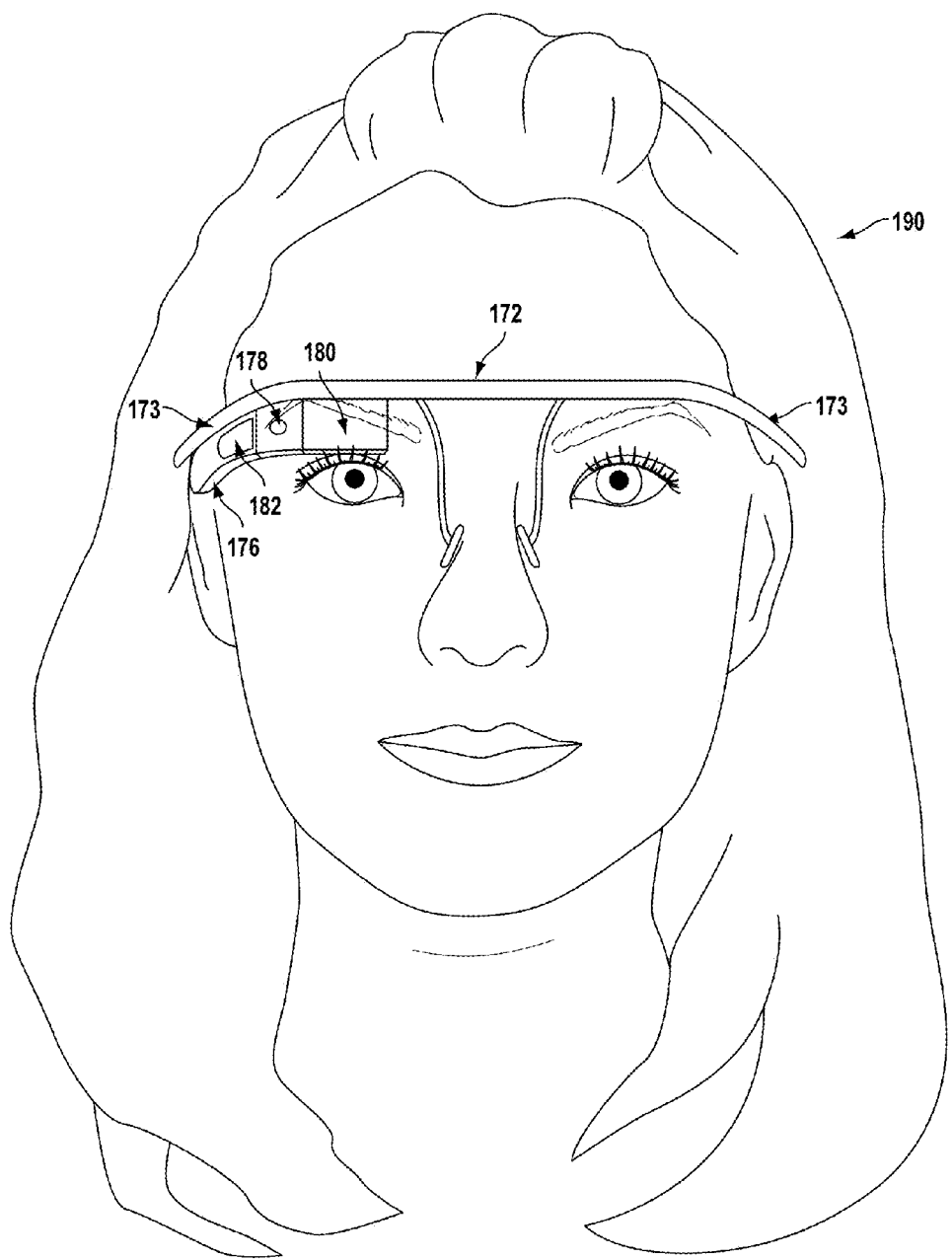
FIGS. 1E-1G are simplified illustrations of the wearable computing system shown in FIG. 1D, being worn by a wearer.
Figure 1F:
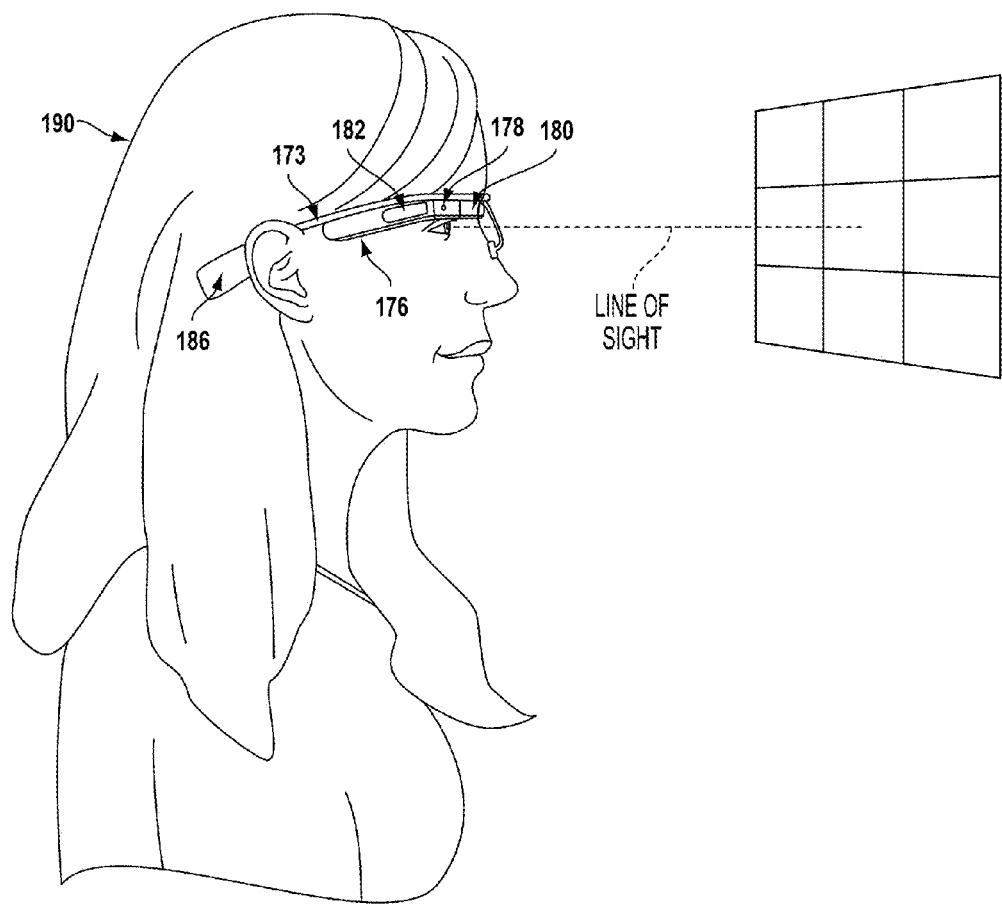
Figure 1G:
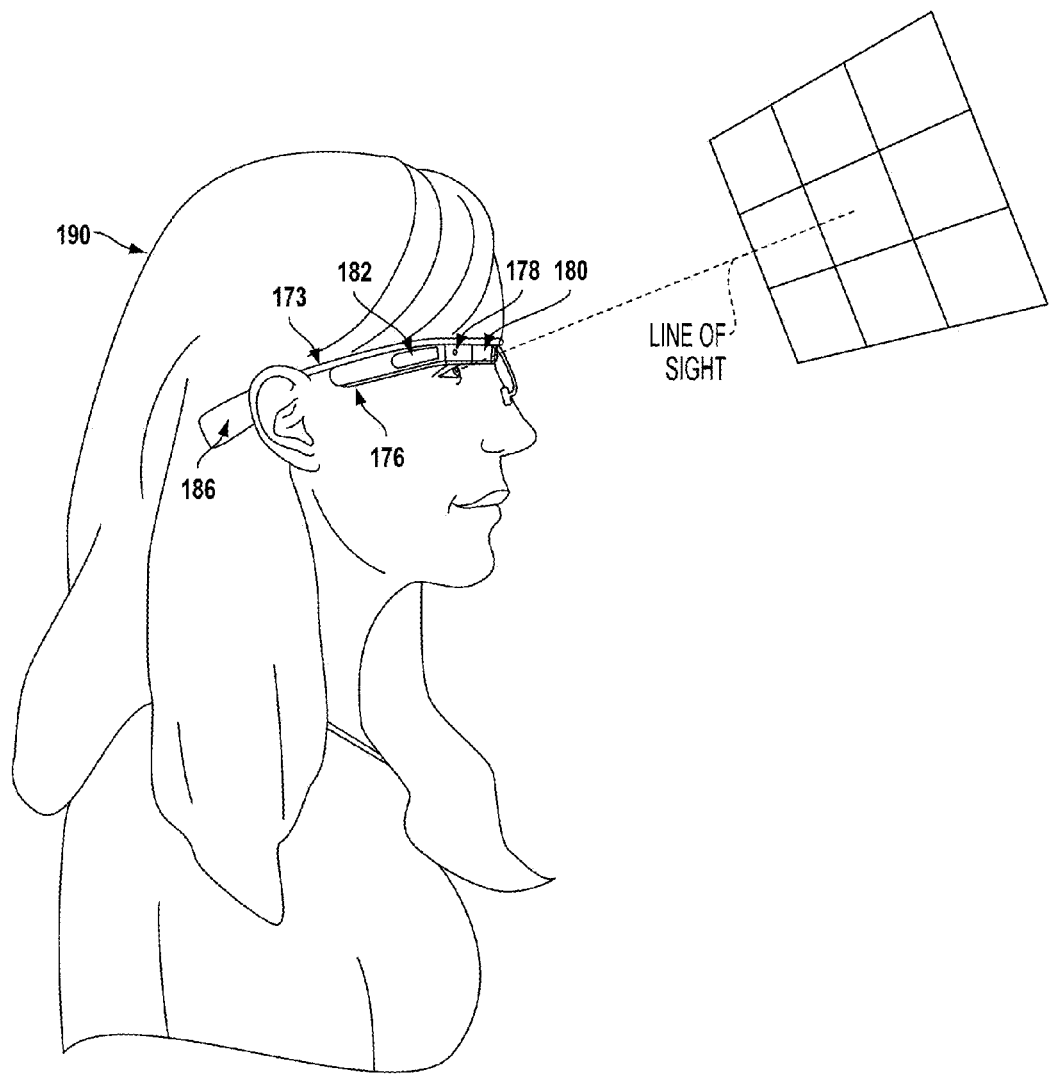

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
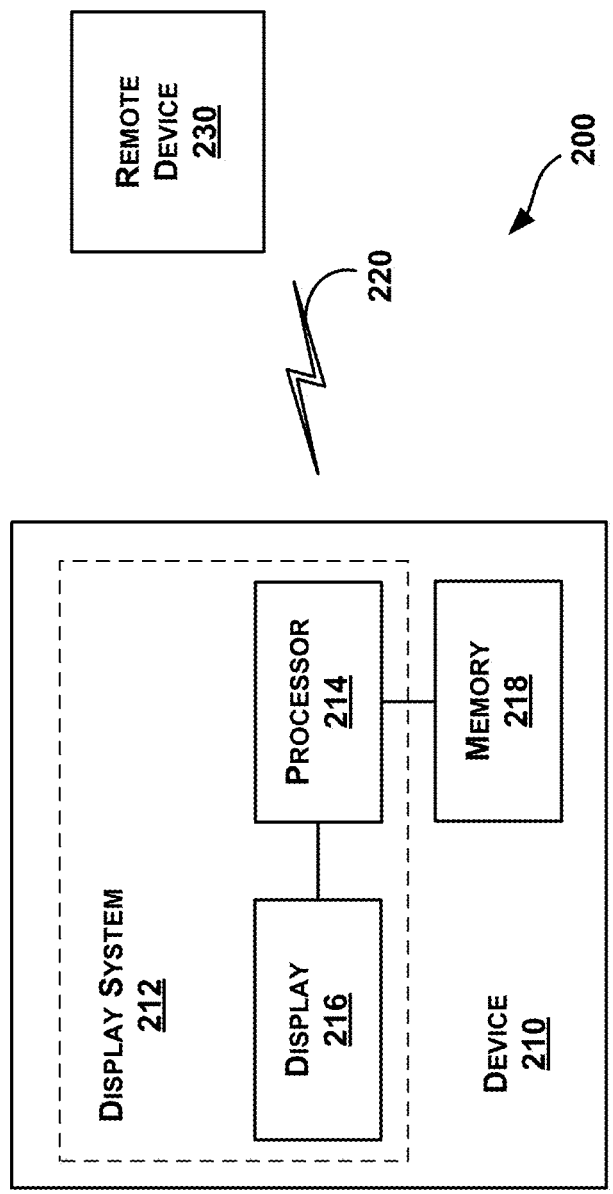
FIG. 2 illustrates a schematic drawing of a computing device according to an example embodiment.

FIG. 2 illustrates a schematic drawing of a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.)

III. Example Methods and Scenarios

Figure 3:
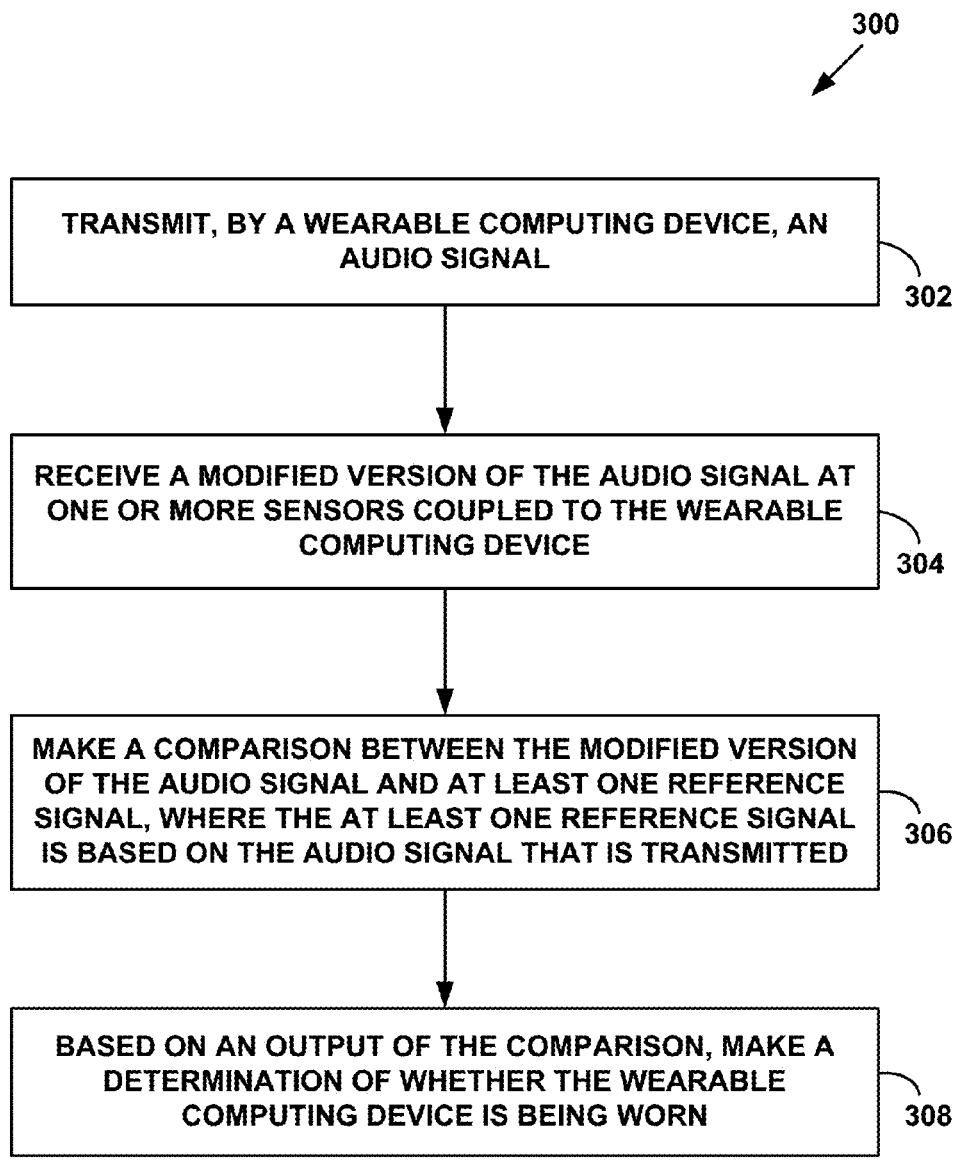
FIG. 3 is a flow chart of an example method according to an example embodiment.

FIG. 3 is a flow chart of an example method 300, according to an example embodiment. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method 300 will be described as implemented by an example head-mountable device (HMD), such as the HMDs illustrated in FIGS. 1A-1G. It should be understood, however, that other computing devices, such as wearable computing devices (e.g., watches), or combinations of computing devices can implement one or more steps of the method 300. Further, the method 300 will be described hereafter in conjunction with FIGS. 4-6, which illustrate implementations of the method 300.

At block 302, the method includes transmitting, by a wearable computing device (e.g., an HMD), an audio signal. The audio signal may be a white noise signal and/or a pink noise signal, although other types of audio signals are possible as well. The audio signal may be generated by a BCT, speaker, or other audio source coupled to the HMD. Further, the audio signal may be transmitted periodically so as periodically determine a worn state of the HMD. The volume, duration, and modulation of the audio signal transmission may vary. For example, in some embodiments, the audio signal may be transmitted at a low volume (e.g., low amplitude) for about 0.25 seconds at a time so as to be transparent to a wearer of the HMD. As another example, the audio signal can be modulated and included as part of another audio signal (e.g., a sound of an ocean, a musical tone, etc.) in order to make the audio signal transparent and less distracting to the wearer. Other examples are also possible.

At block 304, the method includes receiving a modified version of the audio signal at one or more sensors coupled to the wearable computing device. The modified audio signal can be received by one or more microphones or other types of sensors coupled to the HMD. For example, the one or more sensors may include at least a first sensor and second sensor, each configured to determine certain parameters of the modified audio signal. The configuration of the one or more sensors and the locations of the one or more sensors on the HMD may vary based on the types of parameters that are being detected.

Once the HMD receives the modified audio signal, the HMD may process the modified audio signal using frequency decomposition (e.g., Fast Fourier Transforms) or processing in the time domain in order to determine the parameters. The parameters may include resonance (e.g., "ringiness" of the modified signal), which may be determined by an analysis of the power spectrum of the modified signal (e.g., spectral density, in watts per hertz). The parameters may also include a "crispness" of the modified audio signal, which may be determined by an analysis of the impulse response of the modified audio signal (e.g., the crispness of the received modified audio signal may be based on how occluded the transmitted audio signal is). Other parameters are possible as well.

Figure 4:
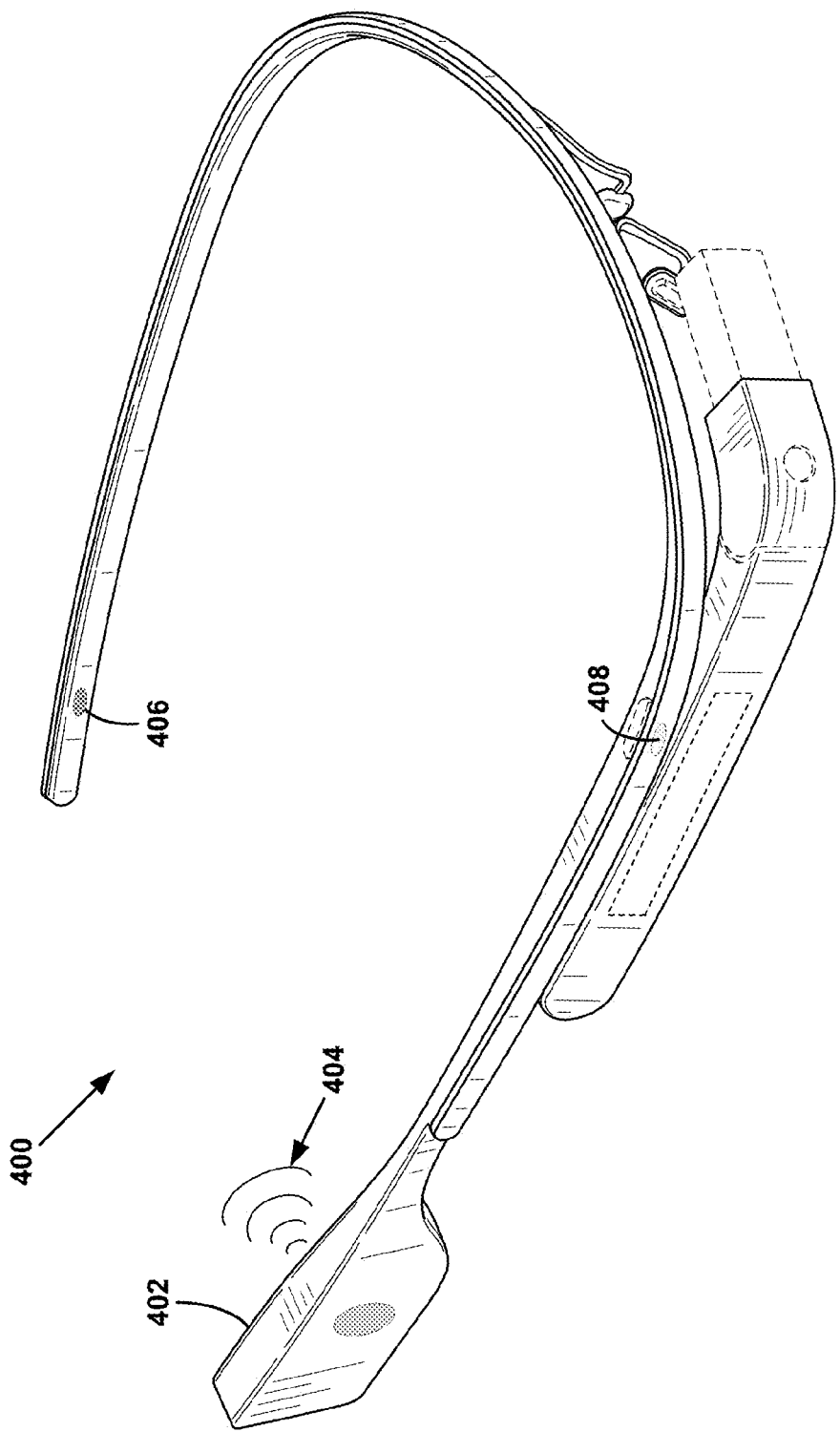
FIG. 4 illustrates an example wearable computing device implementing features of the example method, according to an example embodiment.

FIG. 4 illustrates an example HMD 400 implementing the aforementioned features of the method 300. The HMD 400 may include a BCT 402 configured to transmit an audio signal 404. The HMD 400 may also include a first sensor 406, such as a microphone, located on a side arm at the rear of the HMD 400 opposite the BCT 402. The HMD may also include a second sensor 408 located near the front of the HMD 400. As noted above, the locations of the sensors 404-406 may be different in other embodiments.

In some scenarios, the audio signal may be transmitted through a bone structure of the wearer of the HMD, such as through a skull of the wearer when the wearer is wearing the HMD on their head. Additionally or alternatively, in other scenarios, the audio signal may be transmitted through air and/or another medium, depending on the location of the HMD. As such, the modified audio signal may be representative of alterations made to parameters of the audio signal due to transmission of the audio signal through the given medium. For example, when the HMD is being worn on the wearer's head, the head may dampen the resonance of the audio signal and may also occlude the audio signal, making the received modified audio signal less resonant and crisp than the transmitted audio signal. As another example, when the HMD is sitting on top of a table, the audio signal may be transmitted through mostly air, and thus the resonance and crispness of the audio signal may be altered differently compared to if the audio signal were to be transmitted through the wearer's head or another medium.

In some embodiments, the HMD may determine an "excess kurtosis" measurement of one or more parameters of the modified audio signal. In general practice, excess kurtosis may measure a "peakedness" of a given distribution (e.g., an impulse response distribution). Further, an excess kurtosis measurement, which may be positive or negative in value, may be used to provide a comparison of a shape of a given distribution to that of a normal distribution. Thus, the HMD may be configured to determine excess kurtosis measurements of the parameters of the modified audio signal so as to provide a comparison of the modified audio signal to the transmitted audio signal. Such a comparison may enable the HMD to classify the modified audio signal according to its ringiness and crispness, which may further enable the HMD to determine whether it is being worn by a wearer. It should be understood, however, that while excess kurtosis measurements will be further discussed herein, other measurements may be used by the HMD to classify and compare the audio signals. Equation 1 is an example equation for determining a sample excess kurtosis, y, for a sample of n values, where $m_4$ is the fourth sample moment about the mean, $m_2$ is the second sample moment about the mean, $x_i$ is the $i^{th}$ value, and $\overline{x}$ is the sample mean.

$$y = \frac{m_4}{m_2} - 3 = \frac{\frac{1}{n}\sum_{i=1}^{n}(x_i - \overline{X})^4}{\left(\frac{1}{n}\sum_{i=1}^{n}(x_i - \overline{X})^2\right)^2} - 3 \qquad \text{Equation (1)}$$

At block 306, the method includes making a comparison between the modified version of the audio signal and at least one reference signal, where the at least one reference signal is based on the audio signal that is transmitted. Further, at block 308, the method includes making a determination of whether the wearable computing device is being worn, based on an output of the comparison.

In some embodiments, the reference signal(s) may include one or more parameters that are substantially identical to the parameters of the transmitted audio signal. Thus, the HMD can transmit a known audio signal (e.g., a predetermined reference signal) associated with the HMD being worn, and then compare the received modified audio signal to the known audio signal to determine whether the HMD is being worn. For instance, if the modified audio signal includes parameters that are within a given threshold of parameters of the known audio signal, the HMD may determine that it is being worn. As such, the HMD may have stored data associated with at least two reference signals: one reference signal associated with the HMD being worn, and another reference signal associated with the HMD not being worn. Other reference signals may be used to determine more specific locations of the HMD (e.g., worn around the wearer's neck, laying on a table, being configured with the side-arms open vs. folded, etc.).

Figure 5A:
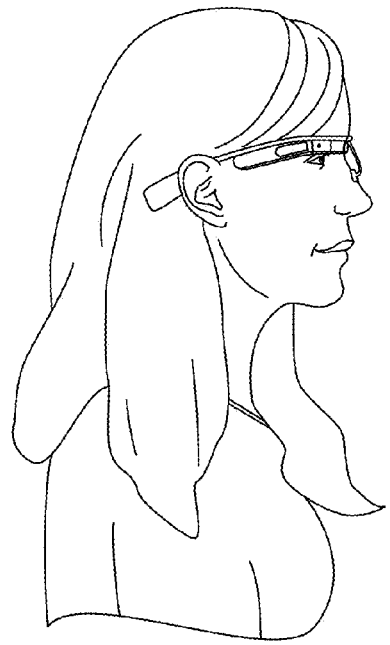
FIGS. 5A-5C illustrate example locations at which an example wearable computing device can be worn, according to an example embodiment.
Figure 5B:
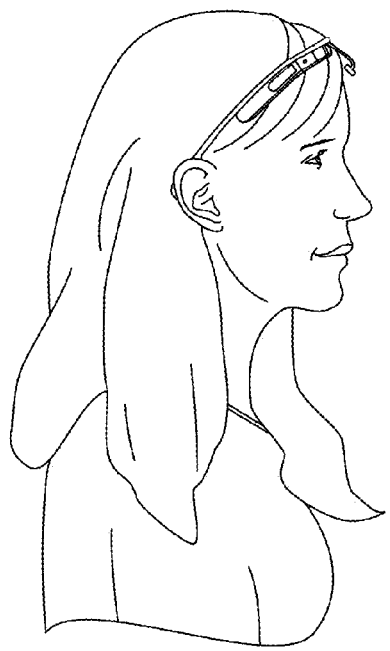
Figure 5C:
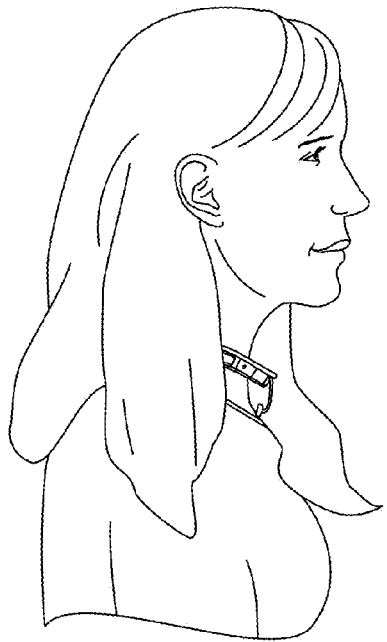

As noted above, the HMD, such as the HMD 172 shown in FIG. 1D and the HMD 400 shown in FIG. 4, may be configured to determine whether it is in a variety of locations, including locations proximate and non-proximate to the wearer's head. FIGS. 5A-5C illustrate example locations at which the HMD can be worn. For example, as shown in FIG. 5A, one "worn state" of the HMD may be a "proper" worn state, in which the HMD is worn such that a nose bridge of the HMD may be contacting the wearer's nose and a display of the HMD may be in front of the wearer's eye. FIGS. 1E and 1F illustrate a properly worn HMD as well. As another example, the HMD may be worn propped up on the wearer's head, as shown in FIG. 5B. As yet another example, the HMD may be worn around the wearer's neck, as shown in FIG. 5C.

As still other examples, the HMD may be hanging from a shirt collar of the wearer, may be placed on a table or other surface, or in the wearer's bag, among other possibilities (which may also be referred to as "worn states," despite the HMD not necessarily being worn).

In some embodiments, each of the aforementioned worn states of the HMD may have an associated reference signal, and the reference signals can be used to classify the modified audio signal according to one of the worn states. In order to classify the modified audio signal, the HMD may implement statistical classification algorithms, with which the HMD may categorize/classify input data (e.g., parameters of the modified audio signals) based on a training set of data (e.g., the parameters of the reference signals). In particular, the HMD may utilize a support vector machine (SVM) model, which may function as a classifier for the modified audio signal based on the modified audio signal's parameters.

Figure 6:
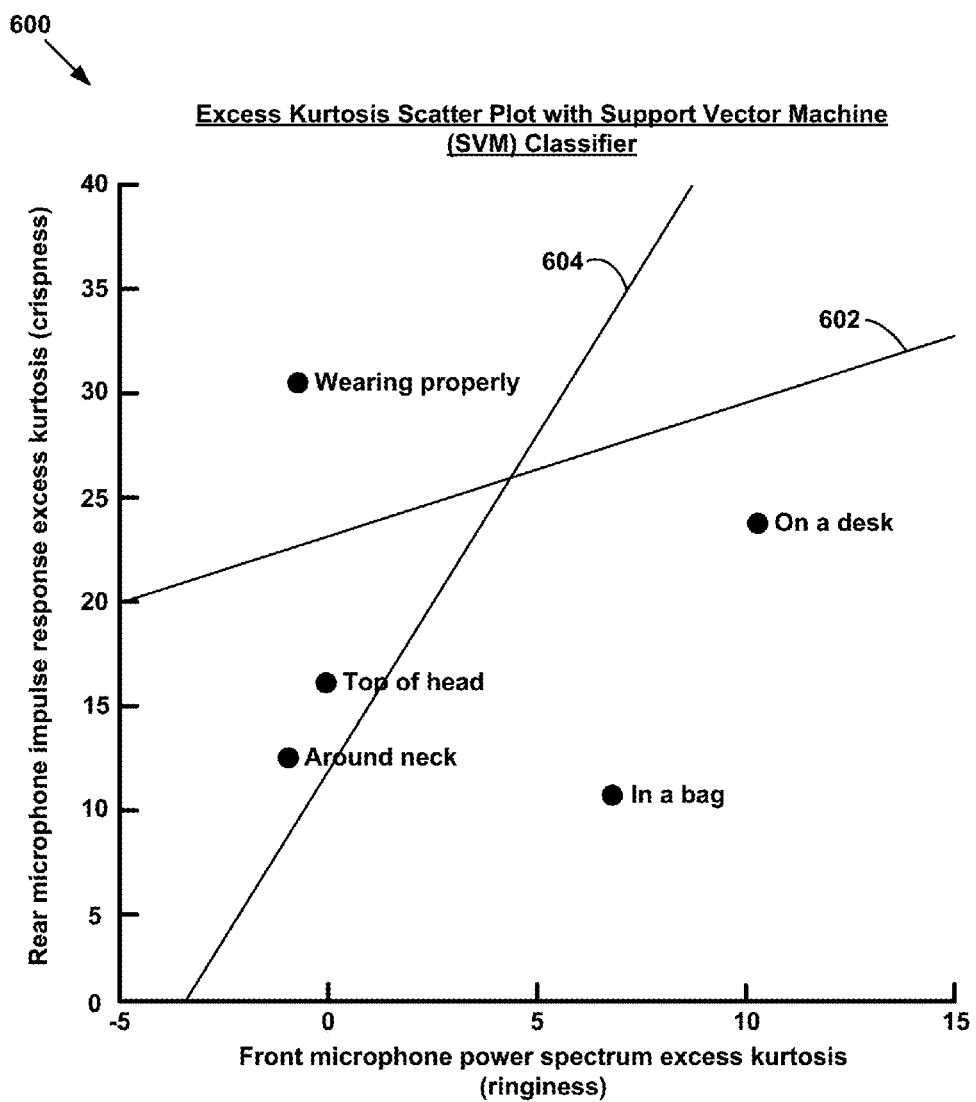
FIG. 6 is a support vector machine (SVM) scatter plot for classification of input data received by an example wearable computing device, according to an example embodiment.

FIG. 6 is an SVM scatter plot 600 for classification of input data received by an example wearable computing device, such as the HMD 400 illustrated in FIG. 4. In general, the SVM plot 600 may be a predetermined correlation relating multiple parameters of the at least one reference signal, the at least one reference signal representing a training set of data collected by the HMD 400. In the example shown, the SVM plot 600 relates excess kurtosis measurements of impulse response parameters of the reference signals, determined by the rear microphone 406 of the HMD 400, and excess kurtosis measurements of power spectrum parameters of the reference signals, determined by the front microphone 408 of the HMD 400. Further, the SVM plot 600 may include two linear classifiers 602-604 used to identify which "class" (e.g., worn state of the HMD) the input data belongs to, the input data being a given modified audio signal received by the HMD 400. While FIG. 6 illustrates an SVM model with linear classification in two dimensions, it should be understood that an HMD can utilize SVM models with non-linear classification in two or more dimensions (e.g., n-dimensional feature vectors) in order to classify received modified audio signals and determine whether the HMD is being worn.

The linear classifiers 602-604 may be based on the excess kurtosis measurements of the reference signals, and can classify the given modified audio signal based on excess kurtosis measurements of the given modified audio signal's impulse response and power spectrum parameters, thereby determining a worn state of the HMD. For example, linear classifier 602 may define two classes: the HMD being worn properly and the HMD not being worn properly. As such, data points (e.g., feature vectors) associated with the worn states "top of head," "around neck," "on a desk," and "in a bag" are located on one side of linear classifier 602, while the data point "wearing properly" is located on the other side. As another example, linear classifier 604 may define another two classes: the HMD being located proximate to a wearer's head (e.g., "wearing properly," "top of head," and "around neck"), and the HMD not being proximate to a wearer's head (e.g., "on a desk" and "in a bag"). Other worn states and linear classifiers are possible as well.

The HMD can be calibrated such that the classifiers are user-specific and/or user-independent. For example, the HMD can be calibrated to recognize the worn states of "wearing properly" and "top of head" based on user-specific classifiers, since the size of the wearer's head may be unique. As another example, the HMD can be calibrated to recognize a worn state of "hanging on a shirt collar" (not shown in FIG. 6) based on a user-independent classifier, since the modified audio signal may be similar in such a worn state regardless of the wearer. The worn states of "on a desk" and "in a bag" may also be based on user-independent classifiers. In such calibration examples, a training set of data may be collected by the HMD (provided by the wearer or other user), and the training set of data may be automatically labeled by the HMD or manually labeled by the wearer of the HMD and/or by the developer of the HMD. The classifier can then be generated.

In some embodiments, the worn state of the HMD may be determined based on whether one or more parameters of a given modified audio signal are within a threshold of one or more parameters of the reference signal(s). For example, the worn state of the HMD may be determined based on whether the excess kurtosis measurements of the modified audio signal are within a threshold of the linear classifiers 602-604. As another example, the data points shown in FIG. 6 may represent default excess kurtosis measurements of reference signals associated with each worn state and, after receiving the modified audio signal, the HMD may compare the excess kurtosis measurements of the modified signal with the reference signal data points. Further, respective predetermined thresholds may exist for each reference signal data point, and thus the parameters of the modified audio signal must be within the predetermined threshold in order to be associated with the worn state signified by the reference signal data point.

In some embodiments, the worn state of the HMD may be determined based on whether the excess kurtosis measurements of the modified audio signal parameters are within the regions of the SVM plot 600 defined by the linear classifiers 602-604. For example, the HMD may determine that the HMD is being worn properly if the measurements of the modified audio signal parameters are within that particular region (and/or if the measurements are within a threshold of the data point associated with the "worn properly" worn state). In other embodiments, if the measurements of the modified audio signal parameters fall within a particular region, but are not within a threshold of any reference signal data point, the HMD may determine that the worn state of the HMD is inconclusive and then transmit another audio signal at a later point in time so as to attempt to determine the worn state again.

In some embodiments, the HMD may include a vibration generator component separate from the BCT. Additionally or alternatively to measuring the parameters of a modified audio signal as described above, the HMD may be configured to vibrate the frame of the HMD using the vibration generator and measure how much the resonance changes (e.g., dampens) using a sensor such as an accelerometer. For instance, the vibration may be dampened more when the HMD is being worn properly than when the HMD is around the wearer's neck. Other measurements can me made additionally or alternatively to measuring the parameters of the modified audio signal.

The method 300 described above can be implemented to verify an HMD's proximity sensor readings or serve as an alternative to using a proximity sensor, in some embodiments. In such embodiments, the proximity sensor (or sensors) may not be configured to distinguish between the HMD being worn properly and the HMD being in other positions or locations, such as being on top of a wearer's head or on a desk. Further, the HMD can incorrectly determine that it is being worn (and/or worn properly) due to the proximity sensor(s) detecting an object other than a head of a wearer (e.g., when the HMD is in a purse, the proximity sensor may in close proximity to an item in the purse and thereby indicate to the HMD that the HMD is being worn).

In one example, the proximity sensor may detect a transition from the HMD not being worn properly to being worn properly, and may indicate to the HMD that the HMD is being worn properly. Upon detection of the transition, the HMD may perform the method 300 so as to verify that the HMD is being worn properly. The comparison between the modified audio signal and the reference signal(s) may then confirm that the HMD is being worn properly. Alternatively, the comparison may refute the proximity sensor(s) detection of the transition. In some examples, the worn state indicated by the method 300 may negate the worn state indicated by the proximity sensor(s), or vice versa. As noted above, the audio signal may be transmitted periodically in order to determine/verify the worn state of the HMD. Other examples are also possible. Other sensors or components of the HMD can also be used to determine a worn state of the HMD, such as the finger-operable touchpad or other sensory devices of the HMD.

It should be understood that the method 300 described above (or variations thereof) can be implemented to verify other sensor readings indicative of a worn state of the HMD. For example, the HMD may include a sensor facing the wearer's eye and configured to detect the wearer's pupil (e.g., if the eye/pupil is detected, the HMD may determine that it is being worn). As another example, the finger-operable touchpad or other sensory devices of the HMD can be used to determine a worn state of the HMD. Other examples are also possible.

In some embodiments, the HMD may receive an output signal indicative of the determination of whether it is being worn. Based on the output signal, the HMD may determine a first power state in which to set itself to operate. For example, if the HMD is being worn properly, the first power state may comprise the HMD operating at a default power level. The HMD may then determine a change in the output signal, indicative of a change in the worn state of the HMD. After a predetermined amount of time since the change in the output signal was detected, the HMD may be configured to transition from the first power state to a second power state. For example, if the HMD transitions from being worn properly to being worn on top of the wearer's head (a transition that may indicate that the HMD is no longer actively being used), the HMD may switch from operating at the default power level to a power level that is less than the default power level, so that the HMD does not consume too much power while it is not actively being used. In other examples, the second power state may be a state comprising the HMD operating at a power level that is greater than the default power level.

In such embodiments, one or more worn states of the HMD may be associated with a given power state. Further, some worn states may have the same power state. For example, the HMD may consume the same amount of power when it is on top of the wearer's head or around the wearer's neck, which may be less than the amount of power consumed when the HMD is being worn properly and may be more than the amount of power consumed when the HMD is on a desk or in a bag (e.g., the HMD may be more "ready-to-use" when on top of the wearer's head than when it is in the wearer's bag or not proximate to the wearer's head). As another example, the HMD may shut down and consume no power immediately when or some time after it determines that it is located on a desk, in a bag, or another location not near the wearer's head or neck. Other examples are also possible.

It should be understood that the HMD may also be configured to change its functionality based on the worn state of the HMD in addition to or alternatively to changing its power state. For example, components such a camera or a display of the HMD may be temporarily disabled upon detecting that the HMD is not being worn, while other components/functions of the HMD may still be enabled. Such components may be disabled so that the HMD does not need to consume as much power. Further, in order to periodically check the worn state of the HMD, the HMD may disable most or all functions of the HMD that are not used for implementing the method 300, so that the HMD can periodically transmit audio signals (e.g., white noise signals) at low power.

User experience of the HMD may change based on the worn state of the HMD as well. For example, if the determined worn state of the HMD is that the HMD is on the wearer's neck or head, but the display of the HMD is not in front of the wearer's eye (e.g., not worn properly), the wearer may receive audio notifications from the HMD (e.g., the BCT generates a tone when an email is received) as opposed to visual notifications on the display, since the wearer may not be able to see the display of the HMD. Further, if the determined worn state of the HMD is that the HMD is off the wearer's head, the HMD may be configured to vibrate as an indication that a notification has been provided to the wearer, or the HMD may be configured not to provide any notifications to the wearer in such a worn state. Other examples are also possible.

V. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   transmitting, by one or more audio sources coupled to a wearable computing device, an audio signal;
   receiving a modified version of the audio signal at one or more sensors coupled to the wearable computing device;
   processing the modified version of the audio signal to obtain at least one impulse response parameter and at least one power spectrum parameter of the modified version of the audio signal;
   determining an excess kurtosis measurement based on the parameters of the modified version of the audio signal;
   comparing the excess kurtosis measurement with reference signal data associated with one or more worn states of the wearable computing device; and
   based on the comparison, determining whether or not the wearable computing device is being worn.

2. The method of claim 1, wherein comparing the excess kurtosis measurement with the reference signal data comprises determining whether the excess kurtosis measurement is within a threshold of the reference signal data.

3. The method of claim 1, further comprising:
   receiving, from another one or more sensors of the wearable computing device, data indicative of whether or not the wearable computing device is being worn; and
   wherein determining whether or not the wearable computing device is being worn is further based on the received data from the other one or more sensors.

4. The method of claim 1, further comprising:
   receiving an output signal indicative of the determination of whether or not the wearable computing device is being worn;
   based on the output signal, determining a first power state of the wearable computing device, wherein the first power state is associated with the wearable computing device operating at a first power level;
   determining a change in the output signal; and
   after a predetermined amount of time, transitioning from the first power state to a second power state of the wearable computing device, wherein the second power state is associated with the wearable computing device operating at a second power level that is different from the first power level.

5. The method of claim 1, wherein the reference signal data comprises a predetermined correlation relating impulse response parameters of at least one reference signal to power spectrum parameters of the at least one reference signal, wherein the at least one reference signal is based on the transmitted audio signal.

6. The method of claim 1, wherein the audio signal includes one or more of a white noise signal and a pink noise signal.

7. The method of claim 1, further comprising transmitting the audio signal periodically.

8. The method of claim 1, wherein the wearable computing device includes a head-mountable device (HMD) configured to be worn by a wearer of the HMD on a head of the wearer.

9. The method of claim 1, wherein the one or more audio sources include one or more of a bone conduction transducer (BCT) and a speaker, and
   wherein the one or more sensors include a microphone.

10. A non-transitory computer readable medium having stored thereon instructions that, upon execution by a wearable computing device, cause the wearable computing device to perform functions comprising:
    transmitting, by one or more audio sources coupled to the wearable computing device, an audio signal;
    receiving a modified version of the audio signal at one or more sensors coupled to the wearable computing device;
    processing the modified version of the audio signal to obtain at least one impulse response parameter and at least one power spectrum parameter of the modified version of the audio signal;
    determining an excess kurtosis measurement based on the parameters of the modified version of the audio signal;
    comparing the excess kurtosis measurement with reference signal data associated with one or more worn states of the wearable computing device; and
    based on the comparison, determining whether or not the wearable computing device is being worn.

11. The non-transitory computer readable medium of claim 10, wherein the wearable computing device is a head-mountable computing device (HMD) configured to be worn by a wearer of the HMD on a head of the wearer.

12. The non-transitory computer readable medium of claim 11, wherein transmitting the audio signal comprises transmitting the audio signal through a bone structure of the head of the wearer,
    wherein the one or more sensors includes at least a first and second sensor proximate to the head of the wearer.

13. The non-transitory computer readable medium of claim 10, wherein the reference signal data comprises a predetermined correlation relating an excess kurtosis measurement of impulse response parameters of at least one reference signal to an excess kurtosis measurement of power spectrum parameters of the at least one reference signal, wherein the at least one reference signal is based on the transmitted audio signal.

14. A system, comprising:
- a head-mountable computing device (HMD);
- one or more audio sources coupled to the HMD;
- one or more sensors coupled to the HMD;
- at least one processor coupled to the HMD; and
- data storage comprising instructions executable by the at least one processor to cause the system to perform functions comprising:
  - causing the one or more audio sources to transmit an audio signal;
  - receiving a modified version of the audio signal at the one or more sensors;
  - processing the modified version of the audio signal to obtain at least one impulse response parameter and at least one power spectrum parameter of the modified version of the audio signal;
  - determining an excess kurtosis measurement based on the parameters of the modified version of the audio signal;
  - comparing the excess kurtosis measurement with reference signal data associated with one or more worn states of the HMD; and
  - based on the comparison, determining whether or not the HMD is being worn.

15. The system of claim 14, wherein comparing the excess kurtosis measurement with the reference signal data comprises determining whether the excess kurtosis measurement is within a threshold of the reference signal data.

16. The system of claim 14, wherein processing the modified version of the audio signal to obtain the parameters of the modified version of the audio signal comprises performing a Fast Fourier Transform on the modified version of the audio signal to obtain the parameters of the modified version of the audio signal.

17. The system of claim 14, wherein determining whether or not the HMD is being worn comprises determining whether or not the HMD is being worn on one or more of: a head of a wearer of the HMD and a neck of the wearer of the HMD.

18. The system of claim 14, wherein the HMD includes a display and a nose bridge, wherein determining whether or not the HMD is being worn comprises determining whether or not the HMD is being worn on a head of a wearer of the HMD such that the display is substantially in front of an eye of the wearer and the nose bridge is contacting a nose of the wearer.

19. The system of claim 14, the functions further comprising:
- receiving, from another one or more sensors coupled to the HMD, data indicative of whether or not the HMD is being worn, wherein the other one or more sensors include one or more of a proximity sensor and a capacitive sensor, and
- wherein determining whether or not the HMD is being worn is further based on the received data from the other one or more sensors.

* * * * *